Oct. 11, 1932.    A. G. F. WALLGREN    1,882,102
SHAFT BEARING
Filed Aug. 23, 1929    2 Sheets-Sheet 1
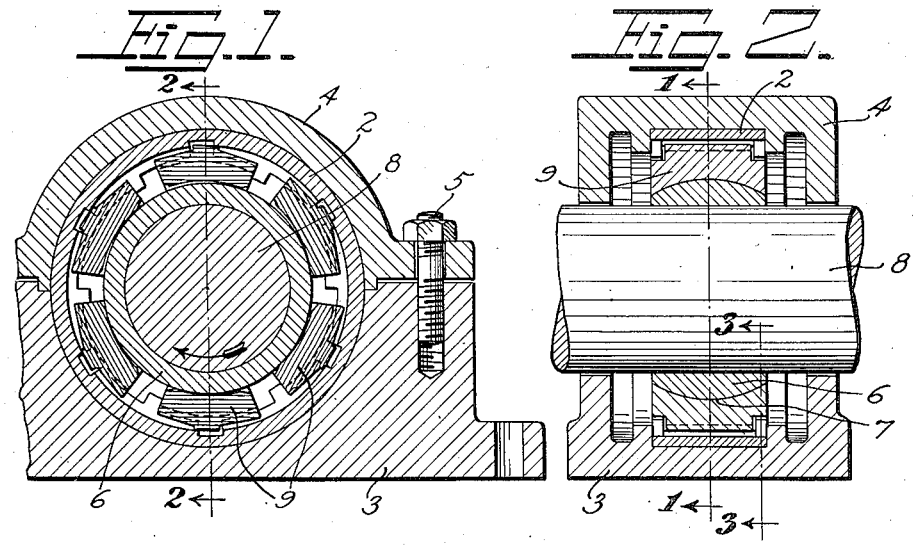
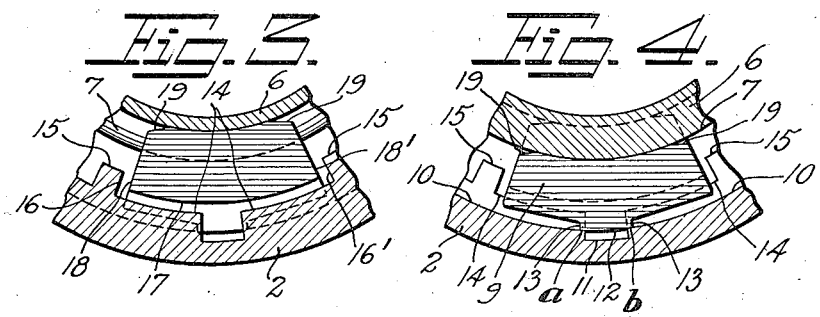
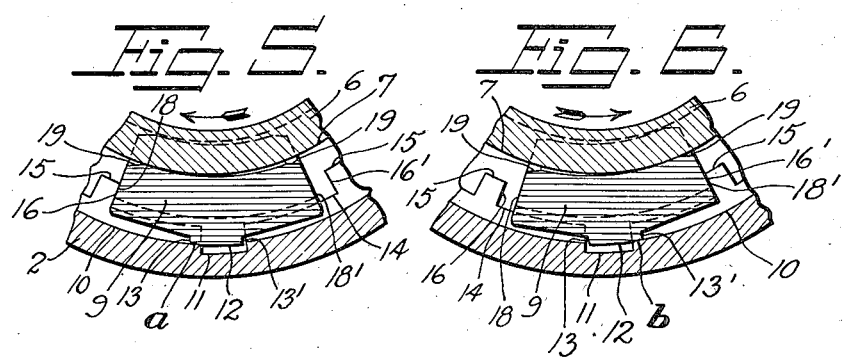
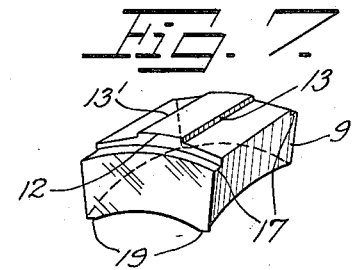
INVENTOR
August Gunnar Ferdinand Wallgren
BY
his ATTORNEY

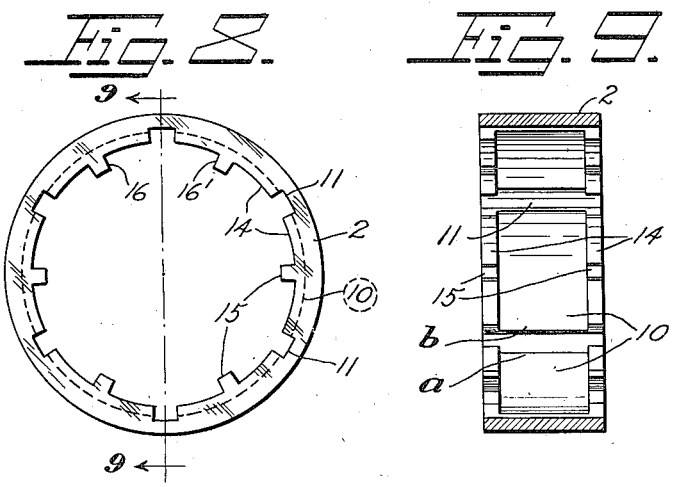

Patented Oct. 11, 1932

1,882,102

UNITED STATES PATENT OFFICE

AUGUST GUNNAR FERDINAND WALLGREN, OF STOCKHOLM, SWEDEN, ASSIGNOR TO AKTIEBOLAGET NOMY, OF STOCKHOLM, SWEDEN, A CORPORATION OF SWEDEN

SHAFT BEARING

Application filed August 23, 1929, Serial No. 388,027, and in Sweden April 27, 1929.

The present invention relates to sliding block bearings of the general character disclosed in U. S. Patent No. 1,871,485 granted to me August 16, 1932 and has particular reference to bearings for shaft journals.

In accordance with the present invention, the bearing blocks are tiltably supported by and have limited peripheral movement with respect to a stationary bearing member, and slide with respect to the shaft journal. This construction enables the advantages inherent in the sliding block type of bearing to be availed of in cases where the nature of the shaft to be supported does not permit of the bearing blocks being carried rotationally by the shaft or by a member secured thereto, while at the same time the advantages of equally effective operation irrespective of the direction of shaft rotation, characteristic of plain journal bearings, are retained.

The more specific nature of the invention and the manner in which it may be carried into effect will appear more fully in the ensuing description of a suitable form of construction as illustrated in the accompanying drawings forming a part of this specification.

With reference to the drawings, Fig. 1 is a cross-sectional view taken on the line 1—1 of Fig. 2, showing a bearing embodying the present invention;

Fig. 2 is a cross-sectional view taken on the line 2—2 of Fig. 1;

Fig. 3 shows a bearing block and adjacent parts in sectional view taken on the line 3—3 of Fig. 2;

Fig. 4 is another cross-sectional view showing the bearing block in central position;

Fig. 5 is a cross-sectional view showing the titled position of the bearing block on shaft rotation in one direction;

Fig. 6 is a cross-sectional view showing the titled position of the block on shaft rotation in the other direction.

Fig. 7 is a perspective view of one of the bearing blocks;

Fig. 8 is a side view of a ring member forming part of the structure; and

Fig. 9 is a cross-sectional view taken on the line 9—9 of Fig. 8.

Reference character 2 designates an annular ring member which is fixed within a bearing housing so as to be stationary. The bearing housing comprises the lower part 3 and the upper part 4 which are secured together by means of stud bolts or the like 5. Reference character 8 designates the shaft which is supported in the bearing and which passes through the housing and the ring member 2. A bearing member 6 is secured to the shaft so as to rotate therewith. Member 6 preferably has a spherical bearing surface 7. Between members 2 and 6 is a plurality of bearing blocks 9. Bearing blocks 9 have slight movement peripherally; that is, about the axis of the shaft 8. However, this movement is limited and these blocks may be said to be stationary blocks. These blocks are stationary after the shaft has started rotation in one direction and during the continuance of such rotation. Blocks 9 are formed with spherical bearing surfaces which cooperate with the outer bearing surface 7 of member 6.

The annular ring member 2 (see Figs. 8 and 9) comprises a cylindrical portion and symmetrical projection portions extending inwardly from the edges of the cylindrical portion. The inside surface 10 of the cylindrical portion is cut by recesses 11 which extend axially and the portions of surface 10 immediately adjacent the recesses constitute peripherally spaced tilting surfaces $a$ and $b$ (see Figs. 4, 5 and 6).

The blocks 9 have projections 12 centrally disposed on the side of the block opposite the spherical bearing surface. Projections 12 are wider than recesses 11. Adjacent to sides 13 and 13' of projections 12, the projections provide peripherally spaced surface portions adapted to cooperate respectively with surfaces $a$ or $b$ to tilt the blocks. When one of these surface portions of projection 12 adjacent a side 13 or 13a is supported by a tilting surface $a$ or $b$ the other surface portion of the projection moves into recess 11.

Ring member 2 further comprises surfaces 14 on the edge projections and central extensions 15. Central extensions 15 form abutments 16 and 16'. The operative positions of the blocks are adjacent to and inside ring member 2. They are positioned between respective abutments 16 and 16' and these abutments cooperate with the sides 18 and 18' of the blocks to prevent peripheral movement of the blocks except within given limits. When the shaft starts rotation, if the blocks are in central position, they move slightly one way or the other until the sides of the blocks meet abutments 16 or 16' respectively, whereupon peripheral movement is prevented. The projections forming surfaces 14 co-operate with cut-away portions 17 of the blocks in order to prevent the blocks from moving axially. Blocks 9 have the edges of the spherical bearing surfaces tapered off as indicated at 19.

The bearing operates as follows:

Assuming that the shaft 8 together with the rotary member 6 begin to rotate in the direction indicated by the arrow in Fig. 5, all the bearing bocks 9 are moved slightly from the position shown in Fig. 4 until the blocks reach the position shown in Fig. 5, wherein the edge 18 strikes abutment 16. The blocks are then tilted because projection 12, adjacent to one side 13, is supported by the tilting surface $a$ whereas the other side 13' is over recess 11. The side 13' therefore settles into the recess and the right-hand side of the block (as shown in Fig. 5) moves radially outward. By this means, each block is eccentrically displaced so that a wedge-like space is formed between each block and the bearing surface 7. The oil film exists in this wedge-like shape. By having this wedge-like shape, the oil can support very heavy loads. It will be seen that the space for the oil grows less in the direction of rotation. Accordingly, oil is forced into this space under high pressure. The formation of the edges 19 aid somewhat in obtaining this result. On account of the tilted position of the blocks and the manner of tilting the blocks, the blocks will automatically adjust themselves to the most suitable position for a given speed of rotation, load or viscosity of oil.

The conditions explained in connection with rotation as indicated in Fig. 5 also arise with bearing blocks in accordance with the invention if the shaft rotation is reversed. If the shaft rotation is reversed to the position shown in Fig. 6, the surface of the projection 12 adjacent side 13' becomes supported over surface $b$ and side 13 sinks into recess 11, thus tilting the block in the other direction. In passing from the position shown in Fig. 5 to the position shown in Fig. 6, the bearing block passes through the position shown in Fig. 3 and Fig. 4, in which position both tilting surfaces $a$ and $b$ support projection 12 of the block. The movement involving these various positions takes place due to the fact that friction between the blocks and the bearing surface 7 of rotatable member 6 is greater than the friction between the blocks and the annular ring 2 because of the formation of the wedge-shaped oil film spaces, as a result of which the blocks hug surface 7 except when the cooperating surfaces of the blocks and the annular ring 2 force them into the tilted positions. In view of this, the movement of the blocks can readily be accomplished in bearings in which the load is decreased more or less in certain positions of rotation or change of rotation as is the case with connecting rods.

While I have shown one suitable form of apparatus for carrying the invention into effect, it will be readily understood that the invention may be carried out with other forms of apparatus and that it is not to be limited to the construction herein shown and described by way of example.

What I claim is:

1. A shaft bearing of the radial type comprising a rotationally stationary bearing housing, a ring member mounted in said bearing housing having projections providing abutments and recesses providing tilting edges, and a plurality of bearing blocks having operative positions adjacent to and inside said ring, said blocks having projections cooperating with said recesses and tilting edges to tilt the blocks one way on shaft rotation in one direction and the other way on rotation in the other direction and said blocks having peripheral movement limited by said abutments.

2. A bearing of the radial type comprising a stationary member and a bearing block having operative positions adjacent said stationary member, said block and stationary member each having peripherally spaced cooperating surfaces arranged to provide alternative supports for causing movement of the block in one direction with respect to the stationary member to tilt the block up on one side and movement of the block in the other direction with respect to the stationary member to tilt the block up on the opposite side.

3. A bearing of the radial type comprising a stationary member, a bearing block having operative positions adjacent said stationary member, said block and stationary member each having peripherally spaced cooperating surfaces arranged to provide alternative supports for causing movement of the block in one direction with respect to the stationary member to tilt the block up on one side and movement of the block in the other direction with respect to the stationary member to tilt the block up on the opposite side and a rotatable member co-acting with said block to move the block relative to the stationary member to effect the aforementioned tilting.

4. A bearing of the radial type comprising a stationary member, a bearing block having operative positions adjacent said stationary member, said block and stationary member each having peripherally spaced cooperating surfaces arranged to provide alternative supports for causing movement of the block in one direction with respect to the stationary member to tilt the block up on one side and movement of the block in the other direction with respect to the stationary member to tilt the block up on the opposite side and means forming part of said stationary member for limiting movement of said block with respect to said stationary member.

5. A bearing of the radial type comprising a stationary member, a bearing block having operative positions adjacent said stationary member, said block and stationary member each having peripherally spaced cooperating surfaces arranged to provide alternative supports for causing movement of the block in one direction with respect to the stationary member to tilt the block up on one side and movement of the block in the other direction with respect to the stationary member to tilt the block up on the opposite side, a rotatable member cooperating with said block to effect the aforementioned movement and means forming part of said stationary member for limiting movement of said block with respect to said stationary member.

6. A bearing of the radial type comprising an annular stationary member, a plurality of bearing blocks having operative positions inside and adjacent said stationary member, each of said blocks and said stationary member having peripherally spaced cooperating surfaces arranged to provide alternative supports for causing movement of the blocks in one rotational direction with respect to the stationary member to tilt the blocks correspondingly up on one side thereof and movement of the blocks in the opposite rotational direction with respect to the stationary member to tilt the blocks up on the opposite sides thereof, a rotatable member passing through said stationary member and cooperating with said blocks to effect the aforementioned movement and means forming part of said stationary member for limiting movement of the blocks with respect to the stationary member.

7. A bearing of the radial type comprising an annular stationary member, a plurality of bearing blocks having operative positions inside and adjacent said stationary member, each of said blocks and said stationary member having cooperating surfaces arranged to provide alternative supports for causing movement of the blocks in one rotational direction with respect to the stationary member to tilt the blocks correspondingly up on one side thereof and movement of the blocks in the opposite rotational direction with respect to the stationary member to tilt the blocks up on the opposite sides thereof and a rotatable member passing through said stationary member and cooperating with said blocks to effect the aforementioned movement.

8. A bearing of the radial type comprising an annular stationary member, a plurality of bearing blocks having operative positions inside and adjacent said stationary member, each of said blocks and said stationary member having cooperating surfaces arranged to provide alternative supports for causing movement of the blocks in one rotational direction with respect to the stationary member to tilt the blocks correspondingly up on one side thereof and movement of the blocks in the opposite rotational direction with respect to the stationary member to tilt the blocks up on the opposite sides thereof, said blocks having spherical bearing surfaces, a rotatable member passing through said stationary member and having spherical bearing surfaces cooperating with the bearing surfaces of said blocks to effect the aforementioned movement, and means forming part of said stationary member for limiting movement of the blocks with respect to the stationary member.

9. A bearing of the radial type comprising an annular stationary member, a plurality of bearing blocks having operative positions inside and adjacent said stationary member, each of said blocks and said stationary member having cooperating surfaces arranged to provide aternative supports for causing movement of the blocks in one rotational direction with respect to the stationary member to tilt the blocks correspondingly up on one side thereof and movement of the blocks in the opposite rotational direction with respect to the stationary member to tilt the blocks up on the opposite sides thereof, said blocks having spherical bearing surfaces and a rotatable member passing through said stationary member and having spherical bearing surfaces cooperating with the bearing surfaces of said blocks to effect the aforementioned movement.

10. A shaft bearing of the radial type comprising a bearing housing, a ring member mounted in said bearing housing comprising an annular cylindrical portion and symmetrical projecting portions extending inwardly from the edges of the cylindrical portion, said projecting portions having central extensions and said cylindrical portion having recesses on the inside thereof between said projecting portions, a plurality of bearing blocks having operative positions adjacent to and inside said ring member, said blocks having surfaces cooperating with said projecting portions and said recesses to tilt the blocks one way on shaft rotation in one direction and the other way on shaft rotation in the other direction.

11. In a shaft bearing of the type having sliding bearing blocks, a ring element comprising an annular cylindrical portion, symmetrical projecting portions extending inwardly from the edges of the cylindrical portion for limiting axial movement of the blocks, said projecting portions having central extensions for limiting peripheral movement of the blocks with respect to said element and said cylindrical portion having recesses on the inside thereof between said projecting portions, the inside of said cylindrical portion providing surfaces adjacent to said recesses for supporting the blocks radially.

12. A bearing of the radial type comprising a stationary member and a plurality of bearing blocks having operative positions adjacent to said stationary member, each of said blocks and said stationary member having peripherally spaced cooperating surfaces arranged to provide alternative peripherally spaced supports for causing movement of the blocks in one direction with respect to the stationary member to tilt the blocks correspondingly up on one side thereof and movement of the blocks in the other direction with respect to the stationary member to tilt the blocks up on the opposite side thereof, and said blocks and stationary member having peripherally disposed cooperating surfaces for limiting axial movement of the blocks.

13. A bearing of the radial type comprising a stationary member and a plurality of bearing blocks having operative positions adjacent to said stationary member, each of said blocks and said stationary member having peripherally spaced cooperating surfaces arranged to provide alternative peripherally spaced supports for causing movement of the blocks in one direction with respect to the stationary member to tilt the blocks correspondingly up on one side thereof and movement of the blocks in the other direction with respect to the stationary member to tilt the blocks up on the opposite side thereof, each of said blocks having peripherally disposed recesses at its sides and said stationary member having axially spaced inwardly extending projections in said recesses for guiding the blocks and limiting axial movement thereof.

14. A bearing of the radial type comprising a stationary member and a plurality of bearing blocks having operative positions adjacent to said stationary member, each of said blocks and said stationary member having peripherally spaced cooperating surfaces arranged to provide alternative peripherally spaced supports for causing movement of the blocks in one direction with respect to the stationary member to tilt the blocks correspondingly up on one side thereof and movement of the blocks in the other direction with respect to the stationary member to tilt the blocks up on the opposite side thereof, each of said blocks having centrally disposed peripheral grooves therein and said stationary member having projections extending into said grooves for guiding the blocks and limiting axial movement thereof.

In testimony whereof I have affixed my signature.

AUGUST GUNNAR FERDINAND WALLGREN.